United States Patent [19]

Cavendish et al.

[11] Patent Number: 5,276,816
[45] Date of Patent: Jan. 4, 1994

[54] ICON OBJECT INTERFACE SYSTEM AND METHOD

[75] Inventors: Catherine J. Cavendish; Stacey C. Ramos, both of Dallas, Tex.

[73] Assignee: International Business Machines Corporation, Armonk, N.Y.

[21] Appl. No.: 636,275

[22] Filed: Dec. 31, 1990

[51] Int. Cl.⁵ .......................... G06F 13/00; G06F 3/03
[52] U.S. Cl. .................... 395/275; 395/159; 364/927.99; 364/281.3; 364/286; 364/286.2; 364/948.21
[58] Field of Search ............... 364/200; 395/159, 275

[56] References Cited

U.S. PATENT DOCUMENTS

| | | | |
|---|---|---|---|
| 4,656,603 | 4/1987 | Dunn | 395/159 |
| 4,787,032 | 11/1988 | Culley | 364/200 |
| 4,791,556 | 12/1988 | Vilkaitis | 395/159 |
| 4,899,136 | 2/1990 | Beard et al. | 395/159 |
| 4,914,567 | 4/1990 | Lipkis et al. | 364/578 |
| 4,920,514 | 4/1990 | Aoki | 395/159 |
| 4,943,932 | 7/1990 | Lark et al. | 364/513 |
| 5,083,262 | 1/1992 | Haff, Jr. | 364/200 |

OTHER PUBLICATIONS

IBM, "Common User Access Advanced Interface Design Guide," Jun., 1989.

Primary Examiner—Dale M. Shaw
Assistant Examiner—Diane Smith
Attorney, Agent, or Firm—Sterne, Kessler, Goldstein & Fox

[57] ABSTRACT

A system and method for interpreting messages sent from an I/O device to an application object in an object-oriented environment, such that the messages interpretation of these messages will be consistent regardless of the I/O device used to generate them. Dynamic binding is used to interpret any object-object interactions that may occur. In general, the message interpretation abilities of the present invention allows additional I/O devices to be used with the object-oriented environment without having to update all the application objects in the environment.

6 Claims, 7 Drawing Sheets

ICON OBJECT INTERFACE SYSTEM AND METHOD

BACKGROUND OF THE INVENTION

1. Field of the Invention

This invention relates to a system and method for communicating signals (referred to as "messages") in a device-independent fashion from an input/output (I/O) device to a software application. More specifically, this invention relates to a system and method for receiving messages from an I/O device, interpreting those messages using object-oriented techniques, and sending the interpreted messages to an application object using an I/O device-independent common protocol.

2. Related Art

In recent years, there has been a move toward creating and using computer programs in an "object-oriented" environment. Such an environment utilizes the concept of "objects," which generally represent manipulatable items having specified "methods." A method represents an operation that an object is capable of performing. The binding of methods into an object is known as "encapsulation."

The items which can be represented by objects include common office objects as well as computer peripherals, computer programs, and documents. An example of such an object (hereafter referred to as an "application object") is one representative of a word processing document. Methods which might be encapsulated within this application object include the ability to invoke a word processing program and to read itself into that word processing program upon receiving a specific message from an I/O device (for example, receiving a left button double-click message from a mouse).

Application objects are typically represented to a user via "icons", which are bitmaps displayed on a visual display device. An icon for a word processing document might, for example, appear as a small grey rectangle with the letters WP in it. The appearance of an icon is typically defined by the bitmap.

Typically, an I/O device such as a mouse allows a user to point to an icon by generating and controlling a pointer marker on the visual display device representative of the I/O device's relative position. In other words, when the I/O device is moved in a given direction, the pointer marker will move in the same direction. In this way, the user can then use the I/O device to move that pointer marker to a desired icon on the visual display device.

The ability to move the pointer marker to the various icons on the visual display device allows a user to utilize the methods of the application objects. This is typically done by moving the icons to various locations on the visual display device, or by using an I/O device to send messages to the application object whose representative icon is pointed to directly. In this way, the icons allow a user to visually relate to the manipulation and interaction of application objects within the object-oriented environment.

An example of manipulating the application objects using icons can be described with reference to the word processing document example above. In this example, a user would manipulate an I/O device such that the pointer marker pointed to the icon representing the word processing document application object. The user could then send the application object a message (for example, by depressing the appropriate button on the I/O device), indicating that the application object is to invoke certain of its methods. In the example noted above, those methods include invoking a word processing program, and causing that program to read in the word processing document.

The above example is one possible way that the application objects can be manipulated in an object-oriented environment to utilize the encapsulated methods of the application objects. As indicated above, icons can typically be moved to other portions of the visual display device using an I/O device. For example, where a mouse is used as the I/O device, by using the pointer marker to point to an icon and depressing and holding one of the buttons on the mouse, a user can move the icon to other portions of the visual display device by moving the mouse.

Again using the above-noted word processing document example, the ability to move icons allows a user to move one of the icons (either the word processing program icon or word processing document icon) representative of an application object on top of the other. In typical object-oriented environments, this "object-object" interaction results in the invocation of the word processing program, and causes that program to read in the word processing document. It should be kept in mind that this result is particular to this word processing document example, and that the results of object-object interactions generally will depend upon the application objects that the icons represent.

As indicated above, I/O devices communicate with object-oriented environments by the sending of messages. In the case of a pointer I/O device such as a mouse, each time one of the buttons on the mouse is depressed, a message is sent to the object-oriented environment. Pushing different buttons or combinations of buttons will typically send different messages. Upon receipt of these messages, it is up to the object-oriented environment as to the interpretation of these messages.

As an example of the interpretation of messages from I/O devices, assume for example that an object-oriented environment contains an application object and icon representative of a word processing program. If a pointer device such a mouse is used to point (with its pointer marker) to the word processing program icon, and then the left button of the mouse is clicked twice, this message needs to be interpreted somewhere in the object-oriented environment. Conventionally, the application object (in this case, the word processing program) itself will receive and interpret this message. Thus, the word processing program would "decide" how to interpret the message. In this example, a message that the left button of a mouse has been depressed might indicate to the application object that the word processing program should now be invoked.

If application object designers knew in advance that a finite number of I/O devices were to be used in conjunction with an application object, then that application object could be designed to interpret all the possible messages which could come from any of those I/O devices. For example, the application object could be designed to interpret messages from both a two button and a three button mouse. In accounting for messages from either of the two I/O devices, the designers could, for example, design the application object so that a message indicating that the third button of the 3-button mouse is depressed is equivalent (that is, achieves the same results) to depressing both buttons of the 2 button mouse simultaneously. Once the application object (or mechanism to generate it) is completed, however, if the designers want the application object to interpret previously unaccounted-for I/O devices such as a four button mouse, portions of the application object (or generating mechanism) may have to be redesigned.

The problem of accounting for new I/O devices is multiplied by the fact that a typical object-oriented environment contains many application objects, and that there may be a considerable amount of redesigning to be done if one or more I/O devices subsequently develop. Thus, it would be desirable to create some scheme which could act as an intermediate between the I/O device and the application objects which would enable a centralized change or addition to be made, if additional I/O devices are implemented, without having to modifying each application object (or mechanism which generates the application object in an object-oriented environment; for example, a word processing program application object can generate a word processing document application object). To minimize the amount of redesigning of the application objects, such a scheme would require that the messages sent to application objects be sent using a uniform protocol, so that designers of the application objects could design all application objects to expect a consistency in the messages received regardless of the type of I/O device used.

In addition to direct interactions with the I/O devices, there are other mechanisms in object-oriented environments which can generate messages which could be equivalent to those generated directly by I/O devices. For example, as indicated above, moving one icon on top of another in an object-oriented environment (that is, an object-object interaction) can cause certain methods of the application objects to be invoked. So that the application objects do not have to be unnecessarily complex, it would be preferable that messages that are sent to the appropriate application object(s) as a result of this interaction are the same message as equivalent messages sent to the application object(s) by an I/O device directly. Otherwise, the application objects would have to be designed to additionally interpret these messages resulting from the object-object interaction individually.

In the situation where one icon is moved on top of another icon as discussed above, the resultant message (that is, the resultant outcome) from this interaction (which is based upon the methods of the application objects which the icons represent) needs to be determined in some way. A conventional technique for making this determination is to use a procedural-based programming environment which can take into account all of the possible combinations of application objects whose representative icons can be dropped on one another.

A problem with the conventional technique, however, is that application objects can be added subsequent to the creation of such a procedurally-based program which were not accounted for by that program. Since the data types of the variables of procedural programs must be known when the program is compiled (that is, the variables are "statically bound"), if variables used to pass a message from one application object to another application object are not of the same type, some data-type conversion must then occur. If the procedural programming environment allows for many different data types, such conversions can become quite cumbersome and complex. What is needed, then, is a system or method for resolving object-object interactions in an environment in which the variables can be "dynamically" bound (that is, bound at run-time), so that data conversions will be unnecessary.

Certain aspects of object-oriented environments which are relevant to the following discussion are noted below. One fundamental aspect of object-oriented environments is that application objects can be organized into classes in a hierarchical fashion. A class defines a certain category or grouping of functions and data within a single entity. Refinement of the methods of the class is achieved by the creation of "sub-classes." In other words, a class can be thought of as a genus, and its subclass as the species. Subclasses allow the introduction of a new class into the class hierarchy, and inherit the behaviors of its superclass while adding new behaviors to the superclass.

Classes are abstract generic descriptions of application objects, methods and behaviors. Instances of a class are created in an object-oriented environment dynamically. An instance is a specific individual entity, something concrete having observable behavior. Instances are dynamically created and deleted. The class, however, is the broad concept under which the instance belongs, and is an abstract concept. The instance inherits all the methods of its class, but has particular individual values associated with it that are unique.

In an object-oriented environment, a class describes certain parameters shared by all instances of the class and certain methods or behaviors. There is only one location in the memory of a computer for the class. There may, however, by numerous instances of the class, each of which has different values and different physical locations in memory.

For example, at the top of an object hierarchy might be an application object called "Office Objects." Methods of Office Objects might include a print method where the user could specify which printer to use by moving the icon of a document to be printed over a printer icon. A class beneath "Office Objects" might be "Word Processors." Methods of application objects in this class might include the ability to send certain control signals to the printers. Beneath this class might be another class such as "Display Write 5". Its methods would be those of that particular word processing program, and would have some formatting information specific to Display Write 5.

In summary, what is needed is an intermediate layer between I/O devices and application objects in an object-oriented environment, such that appropriate messages will be interpreted into a device-independent common protocol, and then be sent to the application objects regardless of the I/O device being used. This would allow for a change to be made in a single location if a new I/O device is to be added. Also, what is needed is a system or method for interactively determining the outcome of an event involving the interaction of two application objects such that the correct message can be sent to the appropriate application object. Such a system or method should use an approach in which the inefficiencies of static binding are overcome.

SUMMARY OF THE INVENTION

The present invention overcomes the deficiencies of conventional technology by providing a system and method for interpreting messages sent from an I/O device to an application object in an object-oriented environment, such that the interpretation of these messages will be consistent regardless of the I/O device used to generate them. In addition, the present invention allows all necessary changes (which need to be made to make additional I/O devices recognizable to the object-oriented device) to be made within the present invention, rather than having to make changes to all the application objects to which the interpreted messages may be sent.

More specifically, the present invention allows for the receiving of a message from an I/O device indicative of an action to be taken. The meaning of this message is then identified, based upon the type of I/O device which generated it, as well as the environment in which the present invention resides. The precise meaning will depend on the protocol chosen (that is, how certain messages for certain I/O devices are to be interpreted). For example, a particular message received from an I/O device may "mean" the same thing to the environment of the present invention as a different message from a different I/O device. In any event, the message will be interpreted into an I/O device-independent common protocol.

In addition to direct interpretation of messages from I/O devices, the present invention also is able to determine if an object-object interaction has occurred as a result of an I/O message. The present invention will then resolve the object-object interaction using dynamic binding, and interpret the resulting message of the object-object interaction into an I/O device-independent common protocol. Whether the message is a direct result of an I/O device, or is a result of an object-object interaction, the interpreted message will be sent to the appropriate application object.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

I. Overview

As indicated above, the present invention relates to a system and method for receiving a message from an I/O device, interpreting the message using object-oriented techniques, and sending the interpreted message to an application object using an I/O device-independent common protocol.

In the object-oriented environment contemplated for use with embodiments of the present invention, the present invention is induced to generate an instance of itself upon the generation of a corresponding application object instance. Thus, the instance can be said to "represent" the application object instance. Since at least one embodiment of the present invention also contemplates managing the bitmap of the icon representative of an application object, the present invention is referred to as an icon object representation.

Figure 1A:
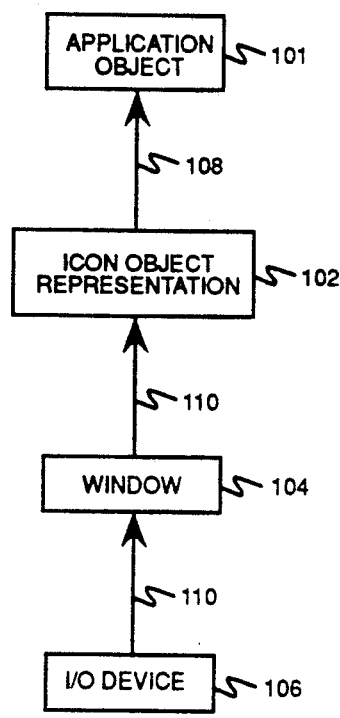
FIG. 1A shows a high-level flow diagram of the environment of an embodiment of the present invention.

Embodiments of the present invention can best be explained with regard to environments in which it is contemplated to exist, and with regard to the flow of messages between entities within the environments. An environment contemplated for use with embodiments of the present invention is broadly shown in FIG. 1A. Referring now to FIG. 1A, the sequence of events begins with an I/O device 106 sending a message 110 to a window 104. The I/O device 106 can be any standard I/O device, such as a keyboard, mouse or other pointer device, disk, etc.

Throughout this detailed description, a mouse is often used as an example of the I/O device 106 in order to explain certain aspects of the present invention. However, it should be understood that the mouse is used only as an example, and that other I/O devices can also be used.

The window 104 keeps track of those icons being displayed on a visual display device (not shown) at any given time. Thus, when a pointer marker (or some other indication) is used to point to a particular icon representative of an application object, and that application object is "selected" (that is, a message 110 indicating such selection is sent from the I/O device 106 to the window 104), the window 104 is in charge of detecting which icon (and thus which application object) was selected. When this determination has been made, the window 104 will pass the message 110 on to the icon object representation 102 representative of the application object pointed to.

While some embodiments of the present invention contemplate the use of the window 104, it should be understood that other embodiments contemplate that the message 110 from I/O device 106 can be passed directly to the icon object representation 102 without the use of window 104.

Upon receiving message 110, the icon object representation 102 will interpret the message into an I/O device-independent common protocol, and send this interpreted message 108 on to its corresponding application object 101. In other words, the icon object representation 102 will identify the meaning of the message 110 based on the type of I/O device that generated the message as it applies to the object-oriented environment, and interpret it appropriately. For example, a left button double-click message from a two button mouse may mean "open" in a particular environment, and thus the message will be interpreted into an "open" message, and sent to the appropriate application object 101. Similarly, a center button double-click from a three-button mouse may also mean "open," and so it too will be interpreted into the same "open" message. In any event, it is contemplated that the application objects used with embodiments of the present invention are developed to all be receptive to some uniform protocol which the messages 110 from the I/O devices can be interpreted to.

The icon object representation 102 thus interprets messages for an application object 101, where the application object 101 need not be concerned with the type of I/O device 106 that is being used. In this way, multiple I/O devices can be used to send messages to the application object 101, and the addition of I/O devices to be used with the environment can be accounted for by updating the icon object representation 102 (that is, adding "methods" to it) rather than changing the application object 101 itself. (It should also be noted that embodiments of the present invention actually contemplate that the message 110 is passed to an instance of the icon object representation representative of the selected application object 101, rather than the icon object representation 102 itself. For the purposes of discussion in this overview, however, this is not emphasized.)

Where multiple application objects 101 are used in the environment contemplated for use with the present invention, the present invention provides that any changes that need to be made to account for a new I/O device can be made to the icon object representation 102. Thus, the effect of a change in the icon object representation 102 is global to all the application objects 101 in the object-oriented environment.

In addition to interpretation of messages 110 such as click of a button on a mouse, the icon object representation 102 also is used in the resolution of an object-object interaction (that is, where one icon representative of an application object is moved on top of another icon representative of a different application object).

II. Class Hierarchy Perspective of Environment

Figure 1B:
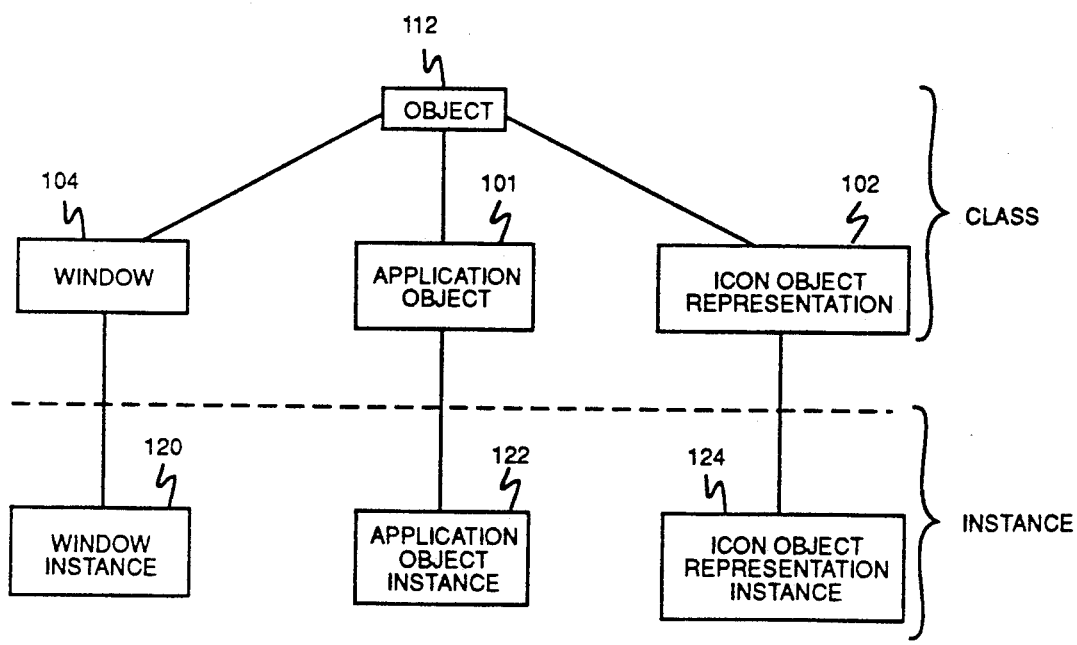
FIG. 1B shows a high-level hierarchical diagram of the environment of an embodiment of the present invention.

FIG. 1B shows the environment of the present invention from a class hierarchy perspective. Referring to FIG. 1B, each portion of FIG. 1A (except I/O device 106) is shown in FIG. 1B as a class beneath the class "object", where each of these classes can generate one or more instances. For example, the set of icons which appear at any given time on a visual display device would be contained in a window instance 120 of the class of window 104.

Each of the icons is representative of a specific application object 101, which is also referred to as an application object instance 122. An example of such an application object instance 122 is a particular word processing document used within the object-oriented environment.

Each application object instance 122 has associated with it an icon object representation instance 124. In one embodiment of the present invention, the icon object representation instance 122 is generated at the same time that the icon representing the application object instance 122 is displayed as part of the window instance 120 appearing on the visual display device. Each icon object representation instance 124 has associated with it the name of its associated application object instance 122, and thus knows where to send any interpreted messages 108 to.

As an example, assume that a visual display device shows several icons. The current window instance 120 would be responsible for keeping track of this particular set of icons. Each of the icons represents an application object instance 122, and each of the application object instances 122 has a different icon object representation instance 124.

When a pointer marker points to an icon representing an application object instance 122 and that application object instance 122 is selected, the window instance 120 will detect which of the icons has been selected and send the message 110 from the I/O device 106 to the appropriate icon object representation instance 124. The message 110 will be interpreted (forming an interpreted message 108) by this icon object representation instance 124 and sent to the application object instance 122 to which the icon object representation instance 124 belongs. If the message 110, for example, was "open" (which, for example, might cause the selected icon object representation instance 124 to be invoked), then the result might be that another set of icons appears in the visual display device, In this way, another window instance 120 will have been generated.

In some embodiments of the present invention, the icon object representation 102, as well as aspects of the environment such as the window 104 utilize the facilities of the SmallTalk V/PM object-oriented environment, from Digitalk Corporation of Los Angeles, Calif. Of course it should be understood that object-oriented languages other than SmallTalk can be used. Also in some embodiments, it is contemplated that the icon object representation 102 is used with computer hardware containing a 16 bit or greater microprocessor (such as an 80286 or 32 bit 80386) of the Intel family of microprocessors from Intel Corporation, USA. Of course, it should be understood that other brands and types of processors and microprocessors can be used with other embodiments.

In general, the use of this object-oriented approach allows the present invention to perform its function in a more efficient manner than was previously possible. This is because the object-oriented environments contemplated by the present invention allow messages to be passed between objects such that any data-type conversions are taken care of automatically by the object-oriented environment. This is because object-oriented environments contemplated for use with the present invention only have a data type of "object" to contend with, as opposed to all the different various types found in conventional procedural languages. Thus, when one object sends a message to another "asking" it what to do during an object-object interaction, no data conversion needs to be done, and thus a great deal of efficiency is gained. This concept in which the objects can "bind" together with each other without worrying about such issues as incompatible data types is referred to as dynamic binding, or "late" binding. This late binding occurs during the object-object interaction.

Figure 2:
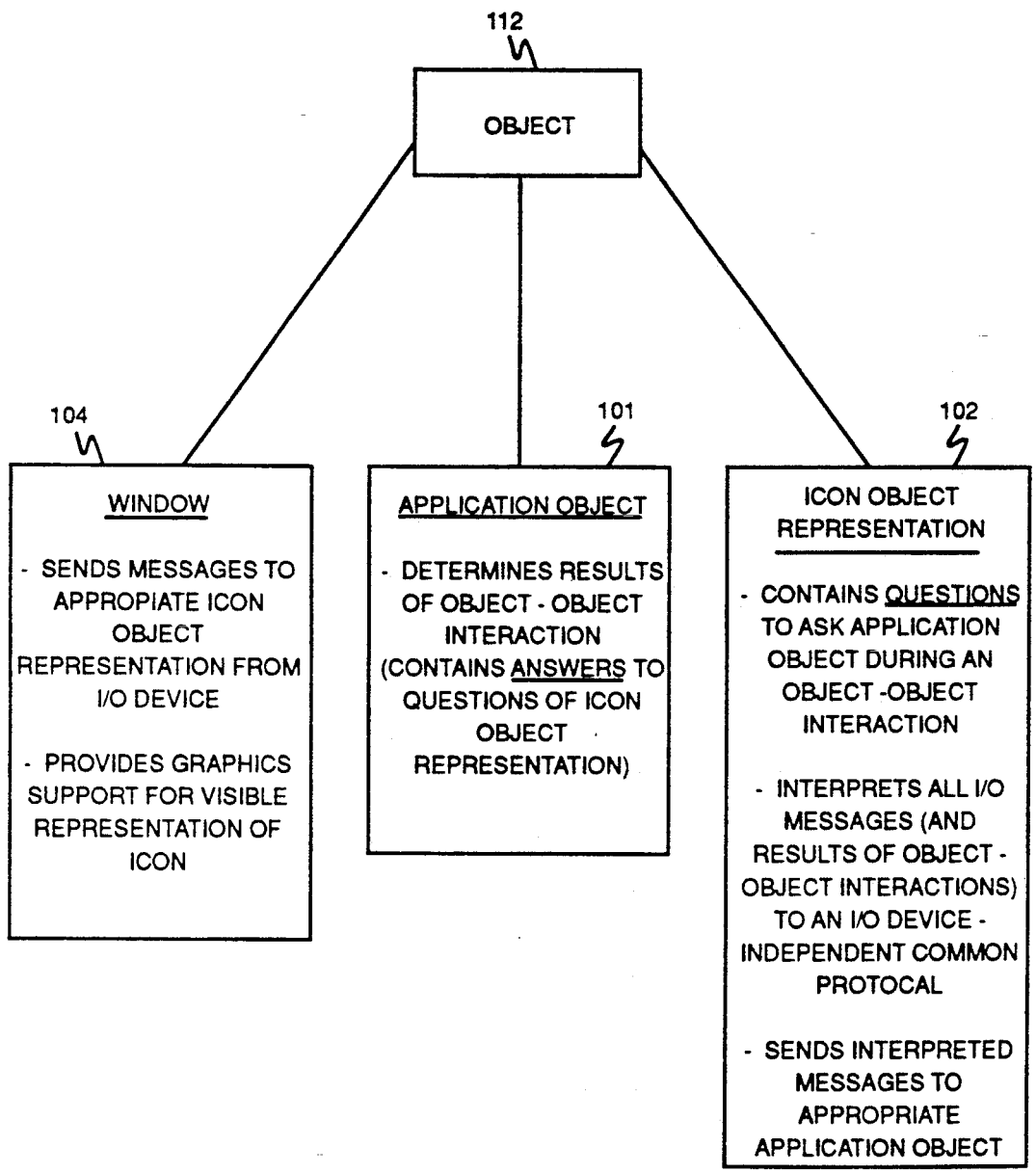
FIG. 2 shows a medium level hierarchical diagram of the environment of an embodiment of the present invention.

FIG. 2 shows a more detailed explanation of the object classes shown in FIG. 1B. Although reference is made only to the classes themselves, it should be understood that in application, specific instances are generated by these classes to carry out the various tasks described. Referring now to FIG. 2, as indicated above, the window 104 is responsible for sending messages which are sent to it by an I/O device 106 to the icon object representation 102. In addition, the window 104 is also responsible for providing the graphics support to create the visible representation of the icon, although the icon object representation 102 is responsible for the actual bitmap of its corresponding individual icon. In one embodiment of the present invention, the window 104 is a sub-class of the application window class in SmallTalk V/PM for drawing and manipulating bits in a visual display device.

Also as indicated above, the icon object representation 102 interprets messages from the I/O device 106 into a device-independent common protocol and sends the interpreted message to the appropriate application object 101. In addition, the icon object representation 102 and application object 101 will send messages back and forth to each other using this device-independent common protocol in order to resolve what action to take in the event of an object-object interaction.

For example, when an object-object interaction occurs, the icon object representation 102 (representative of a first application object) will "ask" questions of the second application object, relating to how to resolve this interaction. This second application object contains the "answers" to the questions asked by the icon object representation 102, and respond according. This response is then sent to both first and second application objects in the I/O device-independent common protocol.

III. The Icon Object Representation

Figure 3:
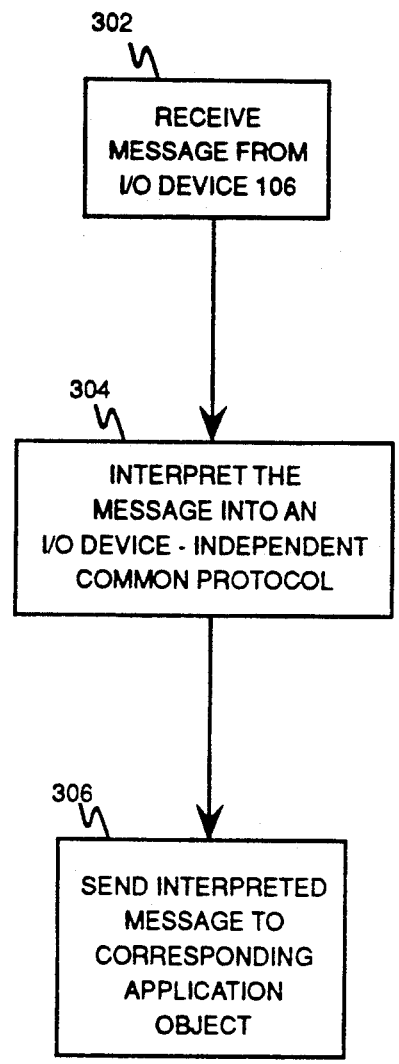
FIG. 3 shows a flow diagram of an embodiment of the present invention.

The icon object representation 102 itself will now be more fully described. FIG. 3 shows a high-level flow diagram of the icon object representation 102. Referring now to FIG. 3, a message is received from the I/O device 106 as indicated by a block 302. This message is then interpreted into an I/O device-independent protocol, as indicated by a block 304. The icon object representation 102 then sends this interpreted message to the corresponding application object, as indicated by block 306.

Figure 4:
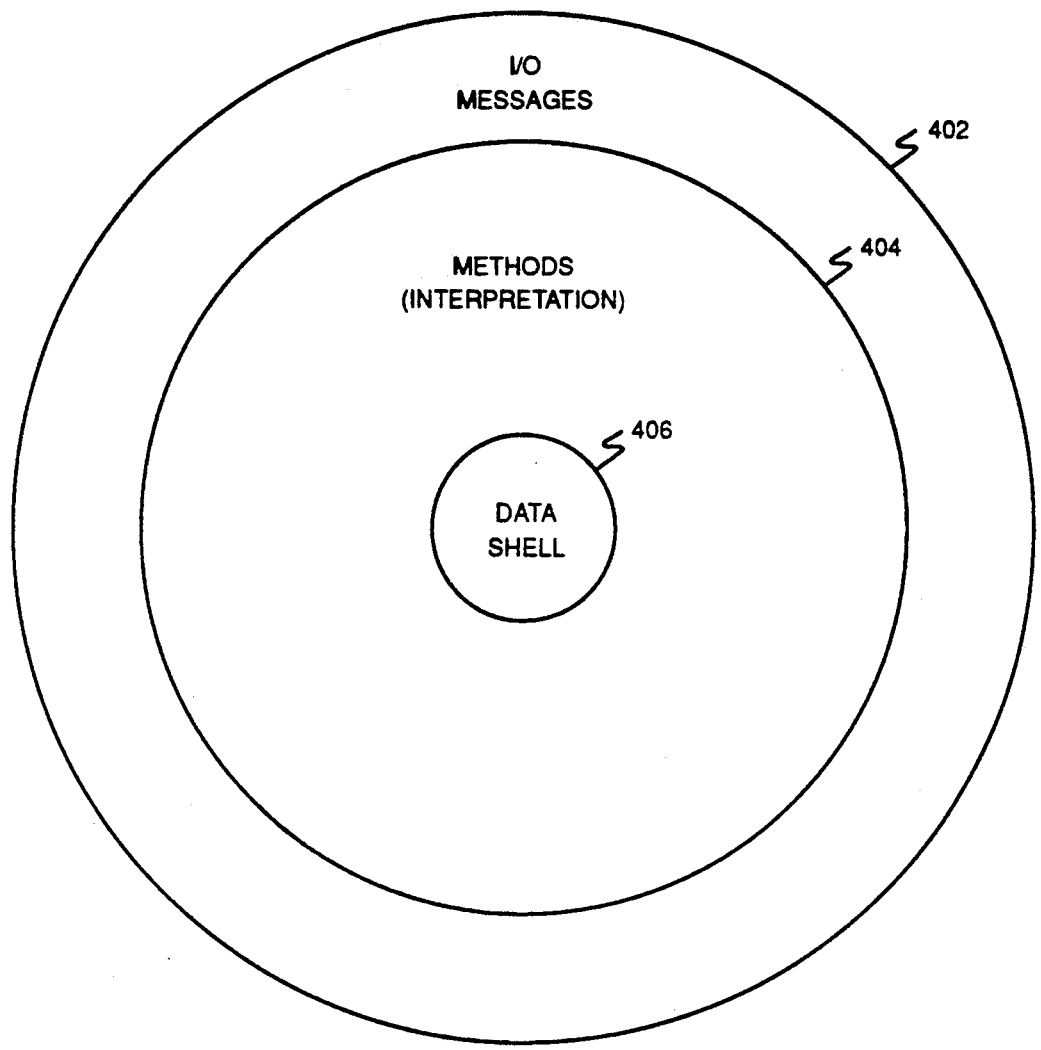
FIG. 4 shows a high-level structural diagram of an embodiment of the present invention.

FIG. 4 shows the generalized structure of the icon object representation 102. Referring now to FIG. 4, the icon object representation 102 can be visualized as a series of concentric shells. The outermost shell 402 represents the I/O messages which are sent from an I/O device 106. The next shell (referred to as the methods shell 404) represents the methods used by the icon object representation 102. The contemplated methods used in the icon object representation 102 include those needed to interpret the I/O messages 402 sent by I/O the device 106.

The innermost shell of the icon object representation 102 is a data shell 406, and is used by the methods of the methods shell 404 of the icon object representation 102. The data in the data shell is comprised of variables which might include various flags and messages indicating the status of the object and/or corresponding icon (for example, a flag may represent whether an icon is in the process of being moved).

Figure 5:
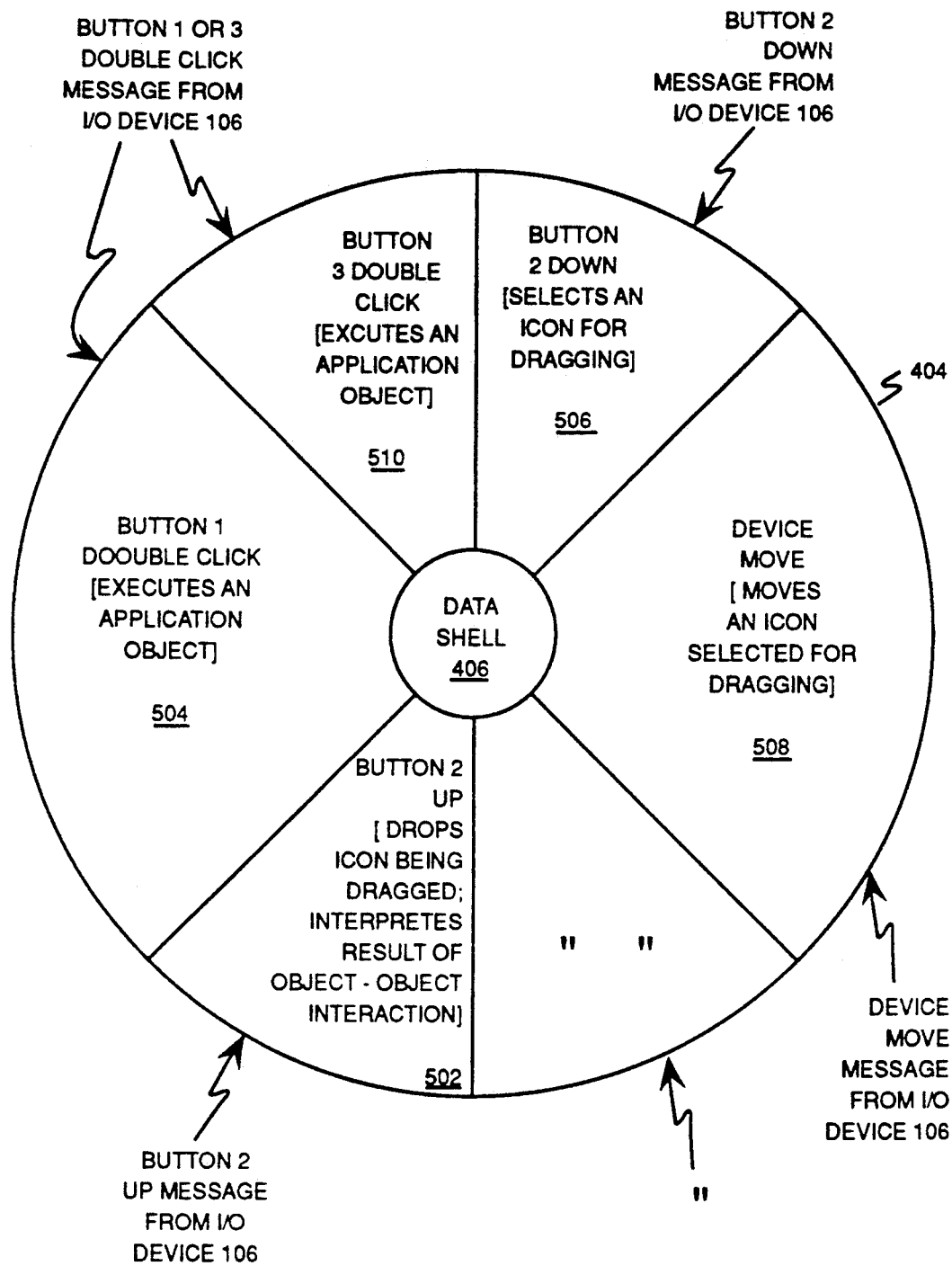
FIG. 5 shows a specific example instance contemplated by an embodiment of the present invention.

FIG. 5 demonstrates an example of methods used in one embodiment of the icon object representation 102 which relate specifically to the use of a pointer device such as a mouse. Although the embodiment shown by FIG. 5 contemplates an icon object representation instance 124, in one embodiment of the present invention the only difference between icon object representation instances 124 is who their owners are (that is, which application object instance 122 they correspond with and which bitmaps they are using), and what specific data values are associated with the variables. Thus, the methods of each icon object representation instances 124 are otherwise identical.

Referring now to FIG. 5, in one example, that portion of the methods shell 404 designated 504 (and referred to as methods 504) as well as methods 510 show that receipt of a message from an I/O device 106 indicating that either button one (from a two button mouse) or button three (from a three-button mouse) was double-clicked will cause this message to be interpreted into a message indicating that the application object instance 122 should be invoked (that is opened). Thus, methods 504 and methods 510 will interpret the double-click message from the I/O device 106 into an interpreted message having a device-independent common protocol indicating that the application object instance 122 should open. This interpreted message is then sent to its corresponding application object instance 122.

The above example thus shows that the interpreted message is generated using different methods and data for each message received from a different I/O device. It should be understood, however, that embodiments of the present invention contemplate that methods 504 and methods 510 in the above example could also be combined into a single method using the same data.

This example shows that the use of button one from a two-button mouse or button three from a three-button mouse will have the same effect as far as the application object instance 122 is concerned. This demonstrates the I/O device-independence of the present invention. In other words, if the present invention receives either a button one double-click message from a two-button mouse, or a button three double-click message from a three-button mouse, the interpreted message sent to the appropriate application object instance 122 will be the same regardless of which type of mouse device was used.

It is emphasized that the example discussed above is only an example, and that the present invention contemplates interpreting a variety of messages from various I/O devices. Further, these messages can be interpreted into a variety of "interpreted" messages.

FIG. 5 also is indicative of embodiments contemplated by the present invention in which certain messages from an I/O device 106 are not interpreted and sent to an application object instance 122, and also where messages that are sent to an application object are an indirect result of actions set in motion by a message from an I/O device 106. An example of the former is where one icon is moved on top of another. In this example, a button two down message from an I/O device 106 is received and interpreted by methods 506.

Also in this example, methods 506 shows that its methods are to select an icon for dragging (that is, moving). Thus, whichever icon is pointed to by the pointer marker when the button two down message is received will be dragged upon movement of the I/O device 106. This is shown by methods 508. Its method thus includes the movement of the selected icon upon movement of the I/O device 106. In one embodiment of the present invention, the methods shown by both methods 506 and methods 508 indicate that no interpreted message is sent to the corresponding application object instance 122. This is because the only the position of the icons has been affected so far, as opposed to any application object instances 122. In other words, only the specific data of the relevant application object instances 122 are affected.

A button two up message from the I/O device 106 will cause the icon being dragged to be dropped wherever it presently is on the visual display device, as indicated by methods 502. Thus, the methods of methods 502 include those which would enable the icon to be dropped. In addition, if the icon is dropped atop another icon, then methods 502 initiate the resolution of the results of the ensuing object-object interaction. The initiation of this resolution is also part of the methods of methods 502, and is an example of the "latter" situation mentioned above where messages that *are* sent to an application object are an indirect result of actions set in motion by a message from an I/O device 106.

In embodiments of the present invention, the device-independent common protocol is contemplated to follow the Common User Access guidelines which are set forth in "System Application Architecture; Common User Access: Advanced Interface Design Guide," June 1989, Publication No. SC26-4582-0 (available from International Business Machines, Armonk N.Y.), and is hereby incorporated by reference.

Figure 7:
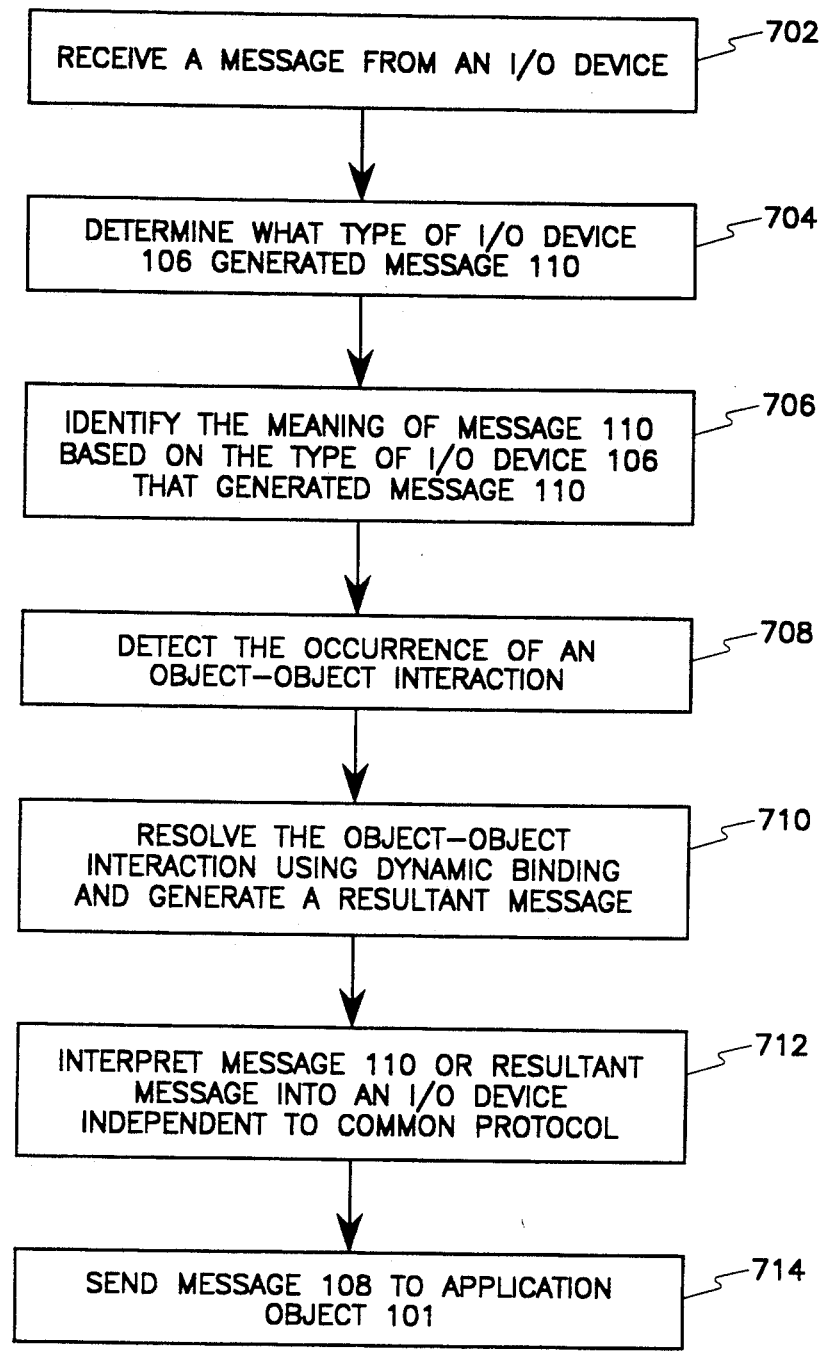
FIG. 7 is a flow chart illustrating a method for providing an object-oriented interface platform according to an embodiment to the present invention.

FIG. 7 is a flow chart illustrating a method for providing an object-oriented interface platform using an icon object representation 102, or, more specifically, an icon object representation instance 124. Referring to FIGS. 1A, 1B, 2, and 7, icon representation instance 124 receives message 110 from I/O device 106. In a step 704, icon object representation instance 124 determines what type of I/O device generated message 110.

In a step 706, icon object representation instance 124 identifies the meaning of message 110 received from I/O device 106. This identification is based on the type of I/O device that generated message 110 as determined in step 704.

In a step 708, icon object representation instance 124 determines if an object-object interaction is to occur as a result of message 110. This determination is based on the meaning of message 110 as identified in step 704.

Figure 6:
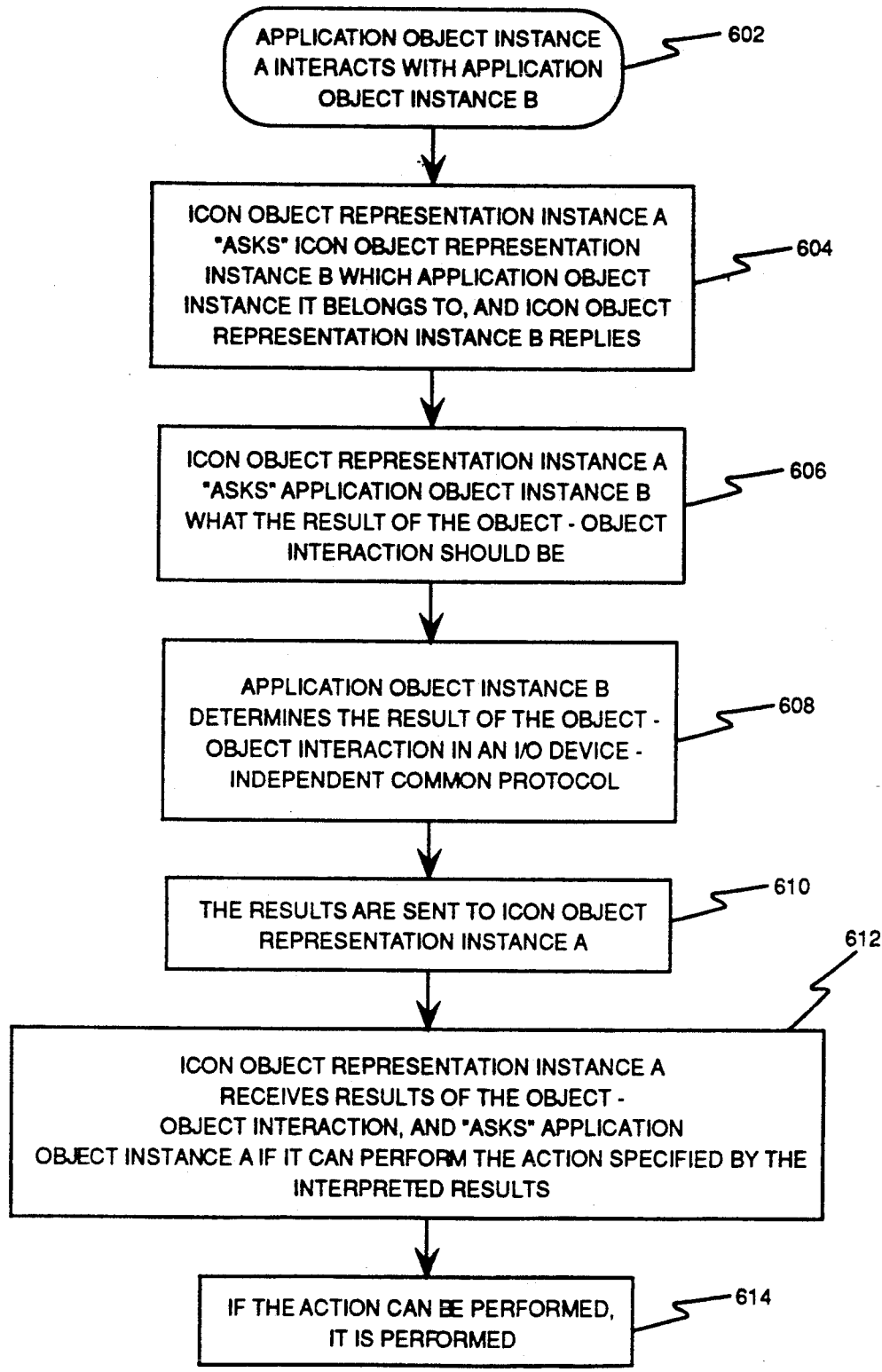
FIG. 6 shows a flow diagram of an object-object interaction in the environment of an embodiment of the present invention.

In a step 710, if an object-object interaction is to occur, it is resolved using dynamic binding between icon object representation instance 124 of icon object representation instance 124, and an application object instance 122. Dynamic binding, discussed in greater detail below with reference to FIG. 6, is an information exchange in which application object instance 122 determines what the result of the object-object interaction should be and generates a resultant message indicating this result. This resultant message is sent to icon object representation instance 124.

In a step 712, icon object representation interprets message 110 or the resultant message generated in step 710 into an I/O device independent common protocol to generate an interpreted message 108.

In a step 714, icon object representation instance 124 sends interpreted message 108 to application object 101.

The way in which object-object interactions are resolved is indicated by the flow diagram of FIG. 6. Referring now to FIG. 6, it is assumed that by virtue of one icon (for example, icon A) being dropped atop another icon (icon B), that corresponding application object instance A interacts with application object instance B, as indicated by block 602. As indicated above, application object instances A and B, generated corresponding icon object representation instances A and B.

Upon the interaction of application object instances A and B, icon object representation instance A "asks" (in the form of a message) icon object representation instance B which application object instance the icon object representation instance B belongs to, as indicated by a block 604. In this example, icon object representation instance B replies that it belongs to application object instance B.

Upon making this determination of ownership, the icon object representation instance A will then "ask" the application object instance B what the result of the object-object interaction should be, as indicated by a block 606. Thus, in this embodiment of the present invention, an instance of an icon object representation 102 needs to be able to ask other instances of icon object representation 102 "who is your owner", and then ask the owner of that icon object representation "what do you do if an object (or representation thereof) is 'dropped' on you?"

Upon receiving its questions from the icon object representation instance A, application object instance B will then determine the results (in the form of an interpreted message 108) of the object-object interaction in an I/O device-independent common protocol, as indicated by block a 608. In one embodiment of the present invention, it is contemplated that the application object instance B is able to determine what to do when any object is "dropped" on it. For example, if application object instance A is a word processing document, and application object instance B is a word processing program, then when icon A is "dropped" on icon B, icon object representation instance A will "ask" application object B "what do you do when a word processing document is dropped on you?" In this case, the answer would be "I invoke myself and read in the word processing document."

If, however, an icon representing a word processing program where dropped upon an icon representing "discard," then the question would be "what do you do when the word processing object is dropped on you?" For this interaction to be effective, the "discard" (application object instance B) would need to know how to do a discard. If it does not know how to react to certain events, then it falls into a default answer, in which the reply would be "I don"t know what to do." This could happen, for example, if an icon representing a printer were dropped on the icon representing "discard." In any event, it is contemplated by embodiments of the present invention that an answer is always returned.

Regardless of what result is given by application object instance B, the interpreted results are sent to icon object representation instance A, as indicated by a block 610. Icon object representation instance A then asks its application object (application object instance A) if it can perform the action specified by the interpreted results. This is indicated by a block 612. If application object instance A can perform the action, then it does so, as indicated by a block 614.

The icon object representation 102 contemplated herein can be derived from the following listing, from which source code and machine code are derivable. Comments are indicated in brackets. In at least one embodiment of the present invention, the source code derivable from this listing is in the SmallTalk V/PM language:

---

Instance Variables cursor [the current cursor bitmap]
    dragging [state variable describing if the
    instance is being dragged]
    dropMessage [the message to send to the
    application object (repObject) if the instance -continued
```
        is dropped now]
      graphPane [the graphPane in which to draw the
         instance]
      icon [the color bitmap of the instance]
      label [the string to write next to the icon
         bitmap]
      location [the point in the graphPane to draw the
         instance (refers to lower left corner of the
         icon)]
      newGraphPane [the graphPane that would be the
         instances graphPane if the instance was dropped
         right now]
      newLocation [the point in the new graphPane
         where the instance would draw the icon if the
         instance was dropped right now]
      repObject [the application object represented by
         the instance]
      selected [a state variable describing whether or
         not the instance is selected for future action]
Class Methods
   new     [instantiate instance variables and create a new
              instance]
Instance Methods
arrowLeft
         [move selection box to left]
arrowRight
         [move selection box to right]
b1double
         [icon has received 'button one double clicked'
         event;
         interpret to mean 'open';
         move selection box to this instance;
         enable the file menu;
         send the 'open' message to the application
         object represented by this instance]
b1down
         [icon has received the 'buttononedown' event;
         reverse the selection state (if selected then
         deselect and vice versa)]
b2down
         [icon has received 'buttontwodown' event;
         interpreted to be start of drag sequence;
         change system cursor to icon bitmap;
         set dragging state and state variables;
         set window focus]
b2up
         [icon has received 'buttontwoup' event;
         change dragging state;
         change cursor back to normal cursor;
         release window focus;
         locate object being dropped on:
              if not self or dropped near another icon
              then dropped on window;
              else get owner of near icon receiving drop
              send dropped near to near object]
display: a GraphPane
         [display the icon of this instance in the
         graphPane (display window) provided]
droppedNear: nearObject
         [icon has received a drop near nearObject;
         send the appropriate dropMessage to self (in
         other words, perform drop message with
         nearObject)]
initialize: anObject
         [set state of instance as follows:
              dragging is false;
              selected is false;
              set pointer to application object being
              represented by this instance;
              initialize null label]
move
         [icon received a mouse dragged event;
         check what object icon is being dragged over,
         determine result of possible drop and whether it
         would be valid;
         if not valid, change cursor to 'illegal' symbol;
         else change cursor to object's icon bitmap]
near
         [return boolean indicating whether icon is near
         mouse location]
overDesktopWindow
         [if over a container window return true
         else return false]
owner
         [return pointer to represented application
         object]
validDrop
         [if instance can be dropped return true (must
         check with graphPane to get 'near' icon and ask
         near icon's owner how it responds to a drop;
         then ask its owner application object if it can
         perform the desired operation)
         if not a valid drop return false]
```

This listing comprises various methods which, upon the occurrence of an event, will be invoked. The listing contemplates the use of a two-button mouse. However, it is emphasized that the present invention contemplates use with a multitude of I/O devices.

It should be understood that present invention is not limited to the embodiments discussed above, and that the examples presented above are merely for the purposes of illustration. The scope of the present invention should therefore be interpreted by the following claims as defined by the forgoing figures and text.

What is claimed is:

1. A system for providing an object-oriented interface platform, comprising:
   first means for receiving a message having a meaning from an I/O device indicative of an action to be taken;
   second means, responsive to said first means, for identifying the meaning of said message, based on what type of I/O device generated the message;
   third means for detecting the occurrence of an object-object interaction based on said message identified by said second means;
   fourth means for resolving the object-object interaction detected by said third means using dynamic binding, said dynamic binding comprising an interaction between,
      an application object instance configured to determine a result of said object-object interaction and generate a resultant message indicating said result of said object-object interaction; and
      an icon object representation instance configured to communicate with said application object instance and receive said resultant message;
   fifth means for interpreting at least one of said message received by said first means from the I/O device and said resultant message generated by said fourth means into an I/O device independent common protocol, to provide an interpreted message; and
   sixth means for sending said interpreted message formed by said fifth means to an application object.

2. The system of claim 1, wherein said interpreted message is provided using methods and data which are different for each said message received from a different I/I device.

3. The system of claim 1, wherein said device independent common protocol of said fifth means conforms to Common User Access guidelines.

4. A method for providing an object-oriented interface platform, comprising the steps of:
   (1) receiving a message having a meaning from an I/O device;
   (2) determining what type of I/O device generated the message;

(3) identifying the meaning of the message from the I/O device, based on what type of I/O device generated the message;

(4) detecting the occurrence of an object-object interaction based on said message, the detection based on the meaning of the message as identified in step (2);

(5) resolving the object-object interaction detected in said step 4 using dynamic binding between an icon object representation instance and an application object instance, wherein dynamic binding is an information exchange in which said application object instance determines a result of said object-object interaction and generates a resultant message indicating said result of said object-object interaction, and said icon object representation instance communicates with said application object instance and receives said resultant message;

(6) interpreting at least one of the message from the I/O device and the resultant message generated in said step 5 into an I/O device independent common protocol, to provide an interpreted message; and (7) sending the interpreted message to an application object.

5. The method of claim 4, wherein said step (5) comprises the step of interpreting the message using methods and data which are different for each said message received from a different I/O device.

6. The method of claim 4, wherein said I/O independent common protocol conforms to Common User Access guidelines.

* * * * *